H. O. BAKER.
REVERSING VALVE GEAR.
APPLICATION FILED MAY 21, 1918.

1,314,847.

Patented Sept. 2, 1919.
3 SHEETS—SHEET 1.

Inventor
Hartley O. Baker
W. T. Fitz Gerald & Co.
Attorneys

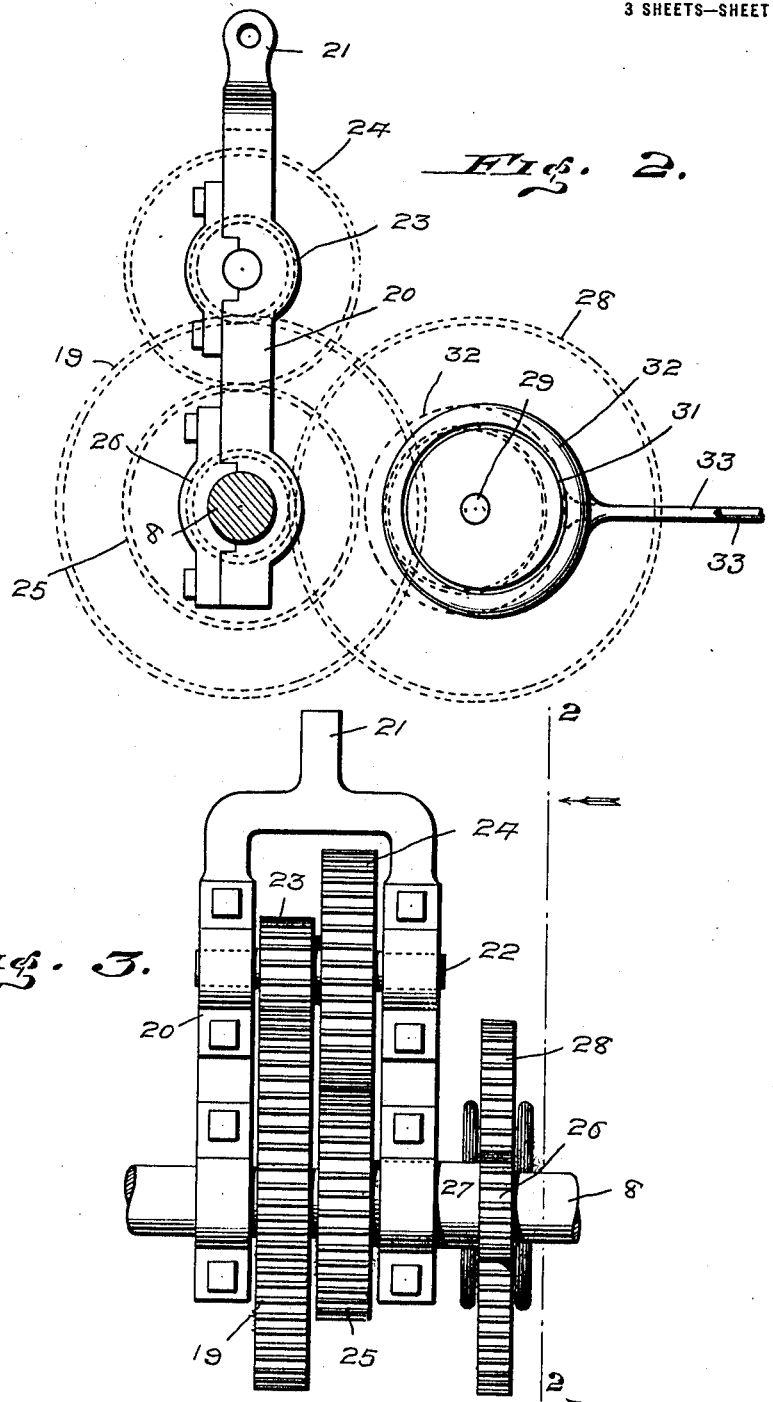

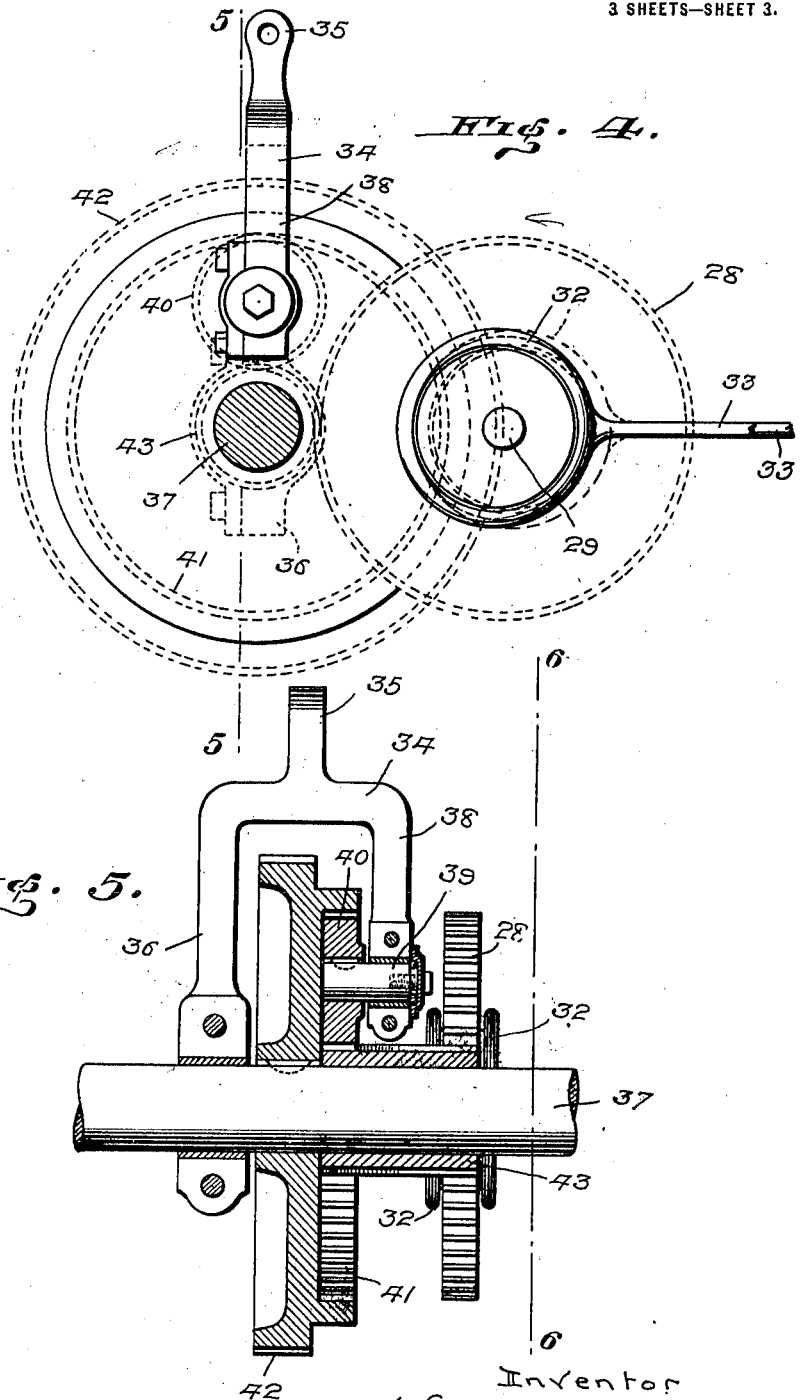

UNITED STATES PATENT OFFICE.

HARTLEY O. BAKER, OF PUEBLO, COLORADO.

REVERSING VALVE-GEAR.

1,314,847.        Specification of Letters Patent.        Patented Sept. 2, 1919.

Application filed May 21, 1918. Serial No. 235,795.

*To all whom it may concern:*

Be it known that I, HARTLEY O. BAKER, a citizen of the United States, residing at Pueblo, in the county of Pueblo and State of Colorado, have invented certain new and useful Improvements in Reversing Valve-Gears; and I do hereby declare the following to be a full, clear, and exact description of the invention, such as will enable others skilled in the art to which it appertains to make and use the same.

This invention relates to reversing valve gear and has for its object to provide a gearing of this character for use in connection with either single or multiple fluid pressure or expansion engines to operate and reciprocate the valves from the main crank movement without the necessity of providing more than one eccentric for each cylinder used and at the same time eliminating the unsatisfactory valve link motion.

The principal objection to most reversing valve gear now in use is that by its actuation, the mean position of the valve or valves over the port or ports is distorted and drawn nearer the crank shaft thereby destroying the lap and lead features of the valve thus causing unequal distribution of the steam or other fluid on opposite sides of the piston.

To overcome this objection I have provided my valve gearing wherein the valve gear is mounted on a bearing stationary with the engine frame and driven through a train of gears which when rotated causes the valve gear to change its relation to the crank shaft without affecting or destroying any predetermined valve position as regards lap or lead or steam distribution on opposite sides of each piston.

With these and other objects in view as will appear as the description proceeds, the invention comprises the various other novel features of construction, combination and arrangement of parts as will be more fully described hereinafter and afterward specifically claimed.

Referring to the drawings:

Fig. 2 represents a diagrammatic sectional elevation taken on a plane indicated by the line 2—2 on Fig. 3.

Fig. 3 represents a front elevation of the valve gear.

Fig. 4 represents a sectional elevation of a modified form of valve gear taken on a plane indicated by the line 6—6 on Fig. 5, and Fig. 5 represents a vertical sectional view taken on a plane indicated by the line 5—5 on Fig. 4.

Figure 1:
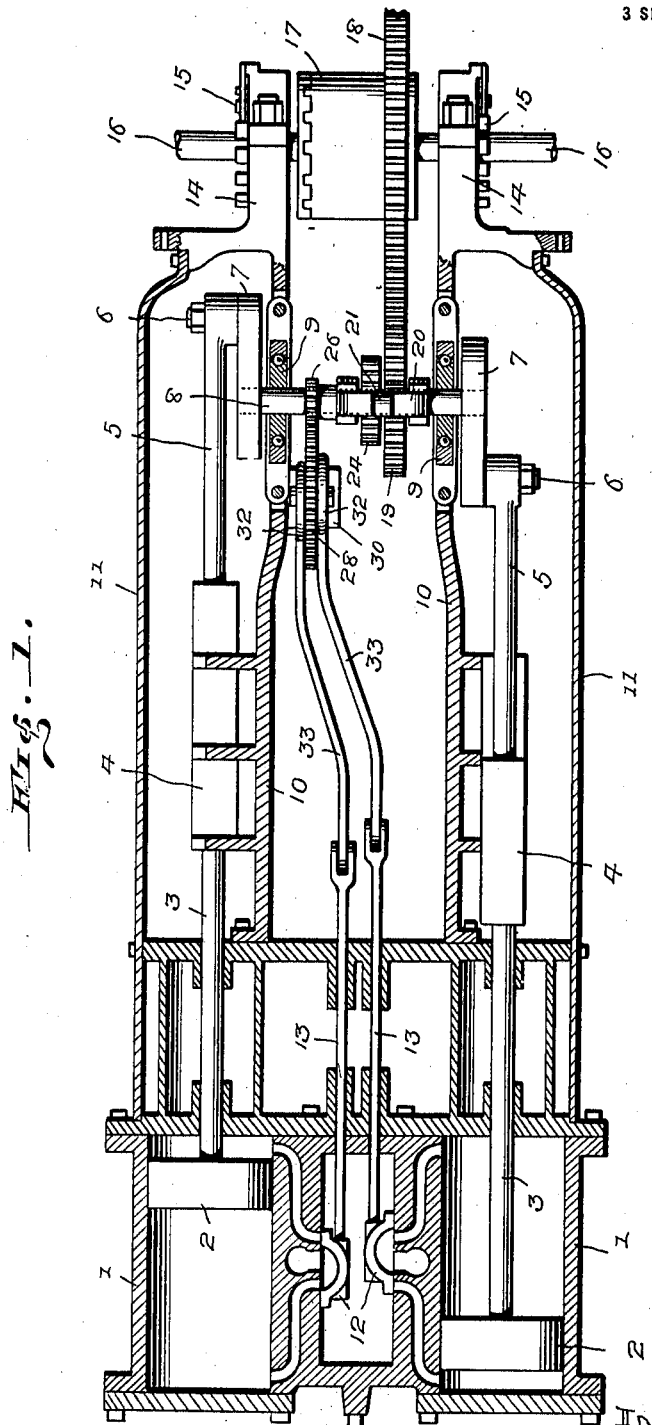
Figure 1 represents a sectional plan view through a multiple cylinder steam engine with the reversing valve gear arranged in opposite positions.

In order that the construction and operation of the invention may be readily comprehended by those skilled in the art to which the invention relates, I have illustrated the preferred embodiment of my invention in the accompanying drawings and will now proceed to fully describe the same in connection with said drawings, in which 1 are the fluid pressure cylinders, 2 the pistons therein, 3 the piston rods, 4 the cross heads connecting the piston rods with the connecting rods 5, which latter are in turn connected to the crank pins 6 carried by the cranks 7 mounted on opposite ends of the engine crank shaft 8. The engine shaft is mounted in suitable bearings 9 supported by the engine frame 10 mounted within and secured to the engine casing 11. 12 indicates the slide valves for the cylinders 1 and are operated by valve rods 13.

The engine frame 10 is provided with rearwardly projecting hangers 14 in which are removably mounted axle bearings 15 that support the axles 16 extending into the differential 17 which latter is provided with a driven gear 18.

The major portion of my reversing valve gear is mounted directly on the engine crank shaft and consists, in the preferred form, of a driving gear 19 directly meshing with the gear 18 of the differential and keyed upon the crank shaft so that motion can be transmitted to the rear axle. 20 is a yoke having its lower ends rotatably mounted upon the crank shaft and its upper end provided with an arm 21 to which a manually operable actuating rod is adapted to be connected.

A stub shaft 22 is journaled in the upper portion of the yoke and has a gear 23 keyed on it to mesh with the driving gear 19. 24 is a gear integral with the gear 23 and also keyed on the shaft 22 and meshes with a gear 25 loosely mounted on the crank shaft. This gear 25 is integrally connected with a smaller gear 26 by a sleeve 27 journaled on the crank shaft and within one arm of the yoke 20.

28 is an operating crank gear meshing with the gear 26 on the crank shaft and mounted on a shaft 29 supported in a suitable bracket 30. An eccentric wheel 31 is mounted on each side of the crank gear 28 and rigidly connected therewith for rotation with it. Eccentric straps 32 encircle the eccentrics 31 and are connected to the valve rods 13 by crank rods 33.

From this construction it will be readily apparent that by swinging the yoke 21 on the crank shaft the relative position of the slide valves with respect to their respective pistons can be reversed at will without in any way destroying the timing of the valves or destroying the lap and lead which invariably cause an unequal distribution of the fluid pressure on each side of the piston. It is to be further understood that this reversing of the valve positions is accomplished without in any way changing the rotation ratio of the gears.

In some instances it may be desirable to use a slightly modified form of valve gears which as shown in Figs. 4 and 5 consists of a yoke 34 provided with an actuating arm 35. One arm 36 of the yoke is rotatably mounted on the crank shaft 37 while the other arm 38 is somewhat shorter and has journaled in its lower end a stub shaft 39 which carries a pinion 40 keyed to it. This pinion 40 meshes with an internal gear 41 carried by the main driving gear 42 keyed on the crank shaft 37 and with a gear sleeve 43 loosely mounted on the crank shaft. This gear sleeve is adapted to be engaged and driven by the valve crank gear 28 and its associated parts as previously described in connection with the preferred form of the invention. The operation of this modified form of gearing is the same as that previously described and likewise is designed to operate without changing the rotation ratio of the gears.

While I have described the principal of operation of the preferred embodiments of my invention I desire to have it understood that such changes in construction and arrangements of parts may be made when desired as are within the scope of the appended claims.

Having thus fully described my invention what I claim as new is:

1. A valve gear embodying a shaft, a gear secured thereon, a sleeve loose on the shaft and having gears thereon, an arm mounted for oscillation on the shaft, a rotary member carried by the arm and geared to the first named gear and one gear of the sleeve, and a valve operating gear meshing with the other gear of the sleeve.

2. A valve gear embodying a shaft, a gear secured thereon, a sleeve loose on the shaft and having gears thereon at its opposite ends, a yoke mounted for oscillation on the shaft astride said gear with one end located between the ends of the sleeve, a rotary member carried by the yoke within the same and geared to the first named gear and the adjacent gear of the sleeve, and a valve operating gear meshing with the other gear of the sleeve.

In testimony whereof I have signed my name to this specification in the presence of two subscribing witnesses.

HARTLEY O. BAKER.

Witnesses:
PAULINE S. BROWN,
FRONIE ABELL.

Copies of this patent may be obtained for five cents each, by addressing the "Commissioner of Patents, Washington, D. C."